Nov. 19, 1940.    A. B. BROLUSKA    2,222,397

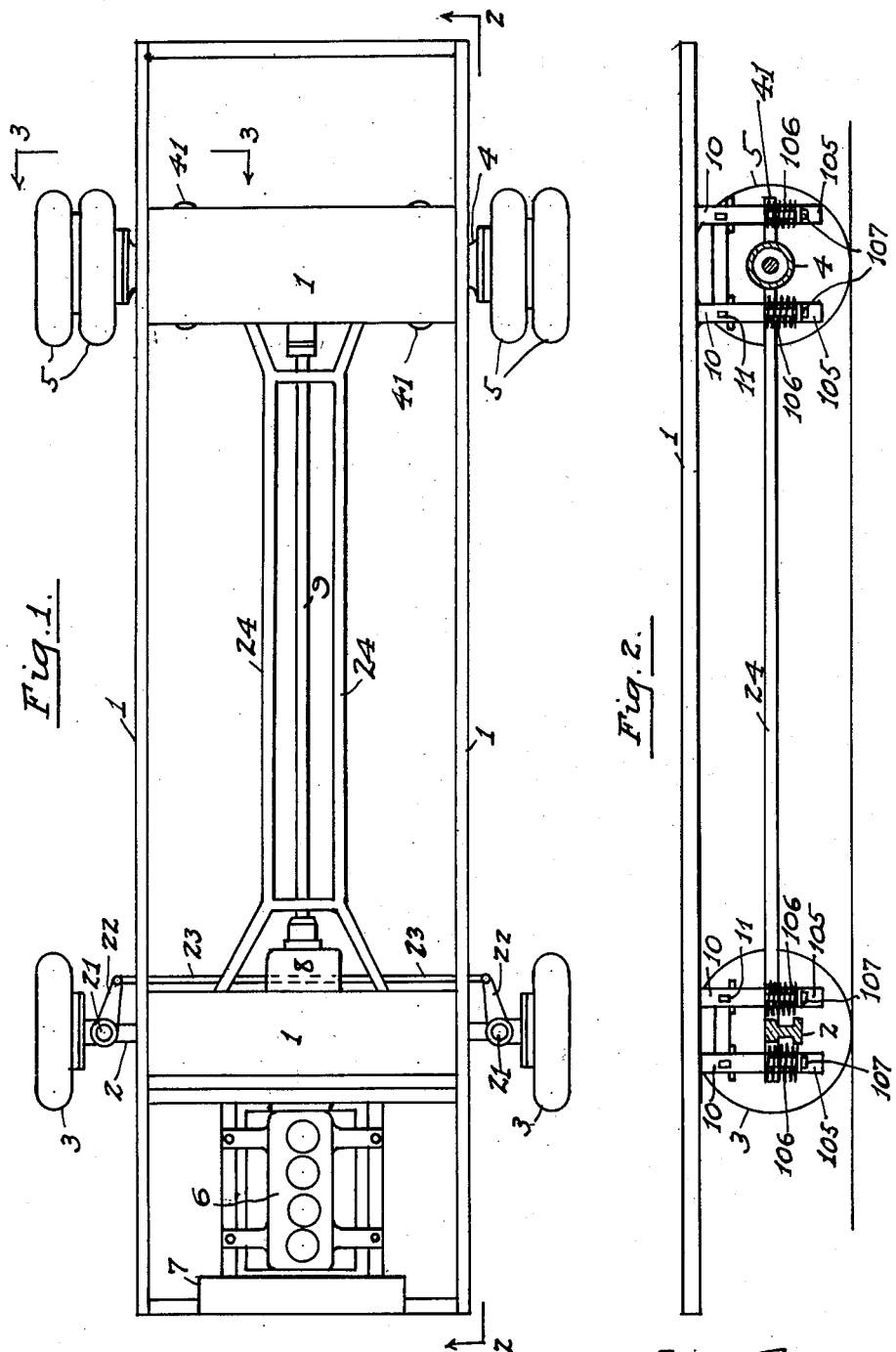

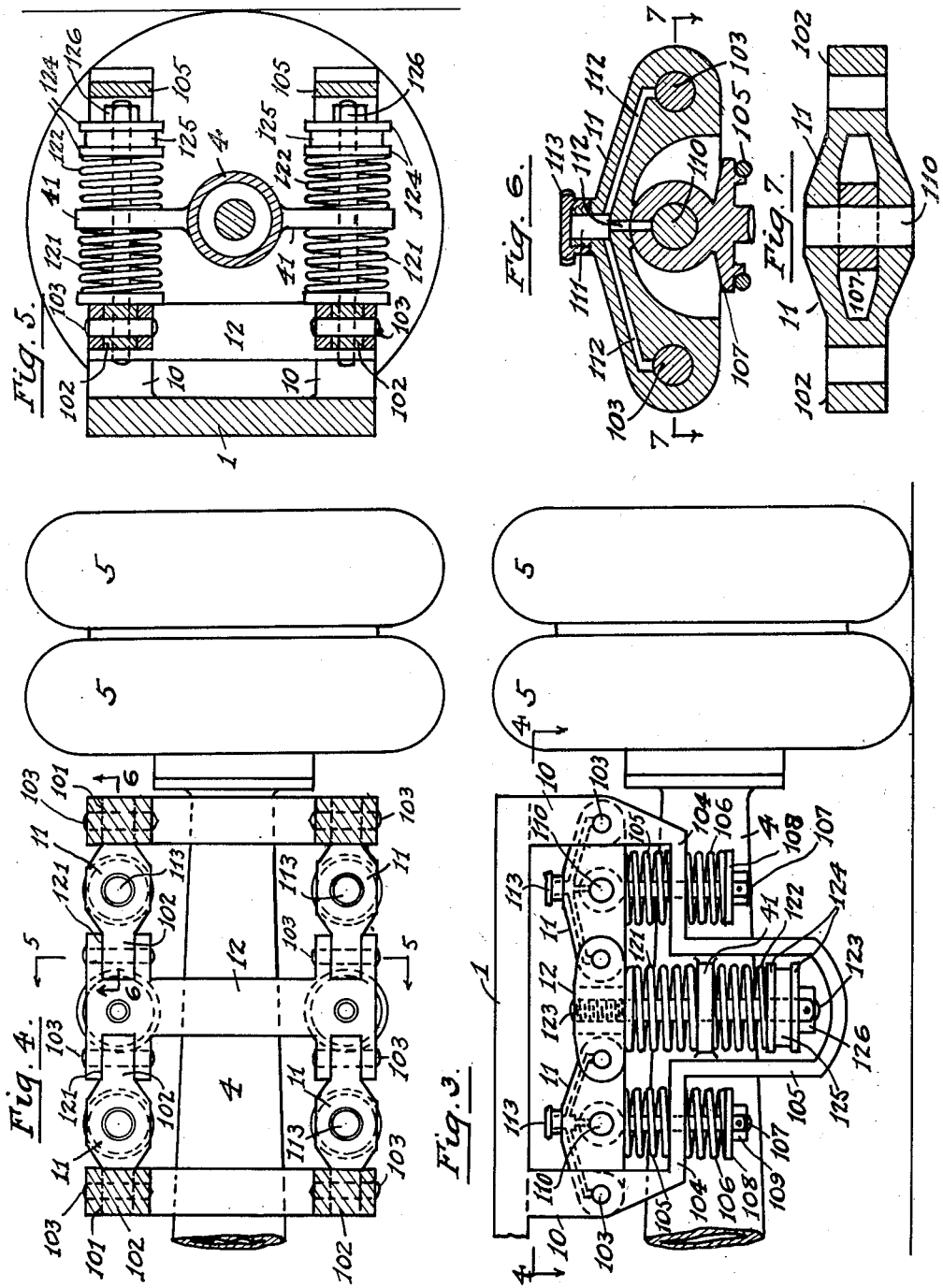

STABILIZING SUSPENSION SYSTEM FOR MOTOR-DRIVEN VEHICLES

Filed Aug. 3, 1938    9 Sheets-Sheet 3

Inventor:-
Amel B. Broluska

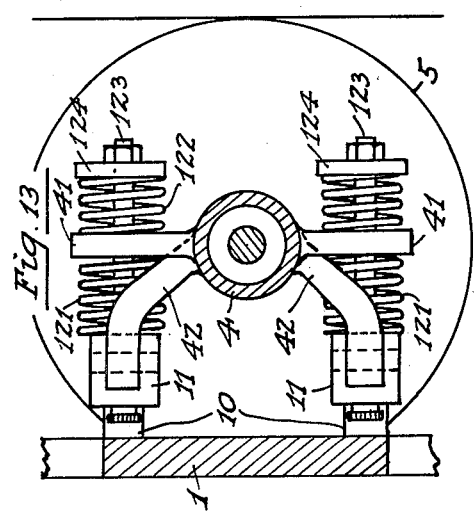
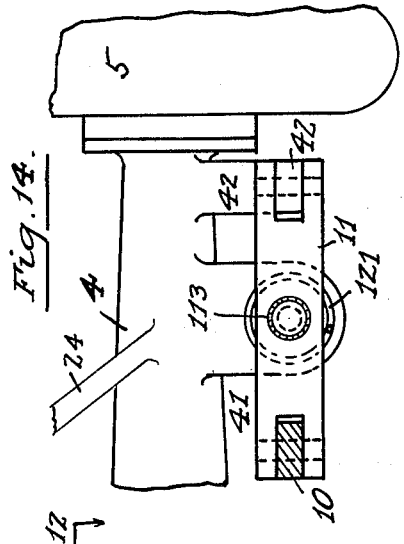
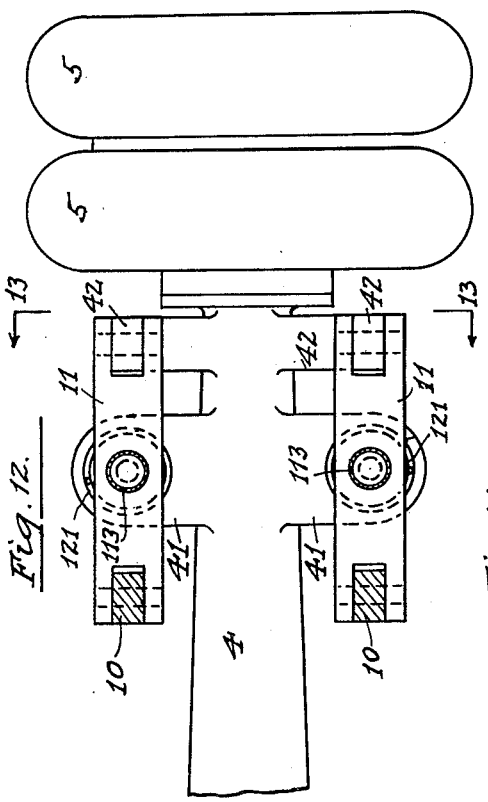
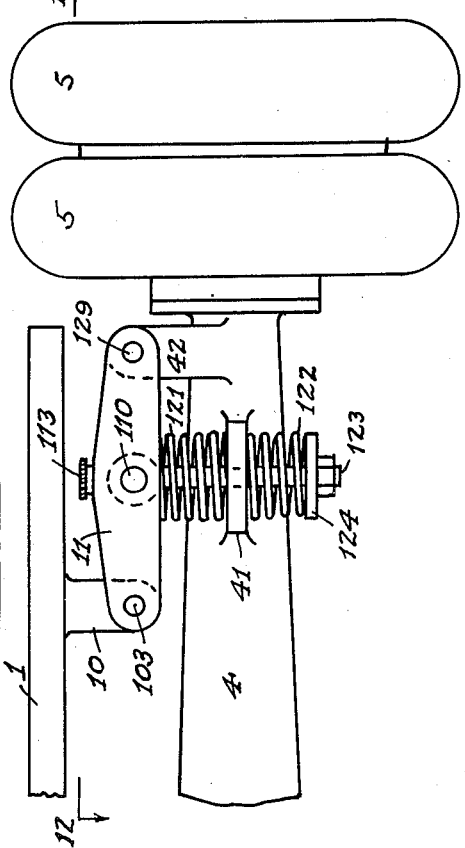

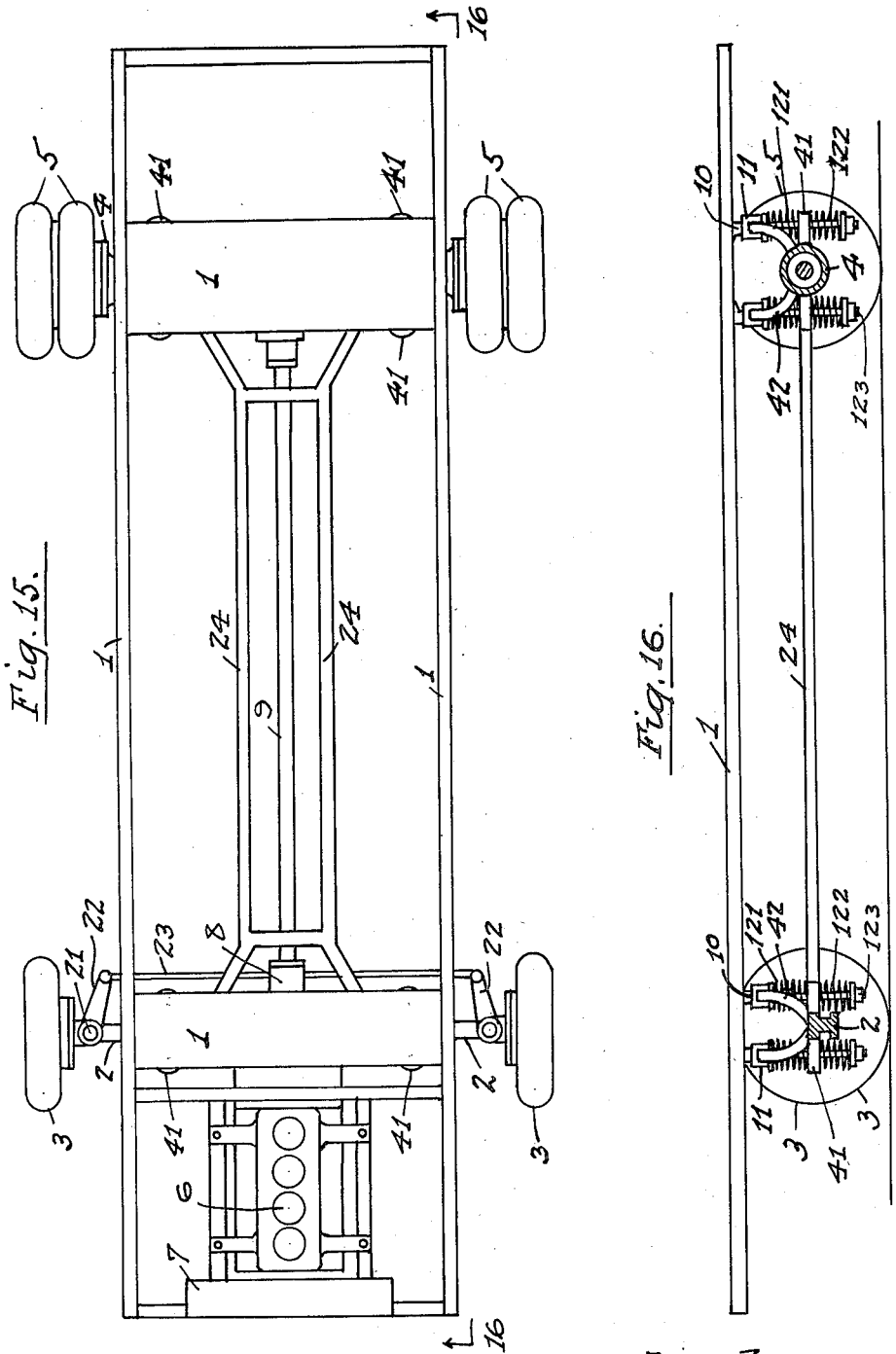

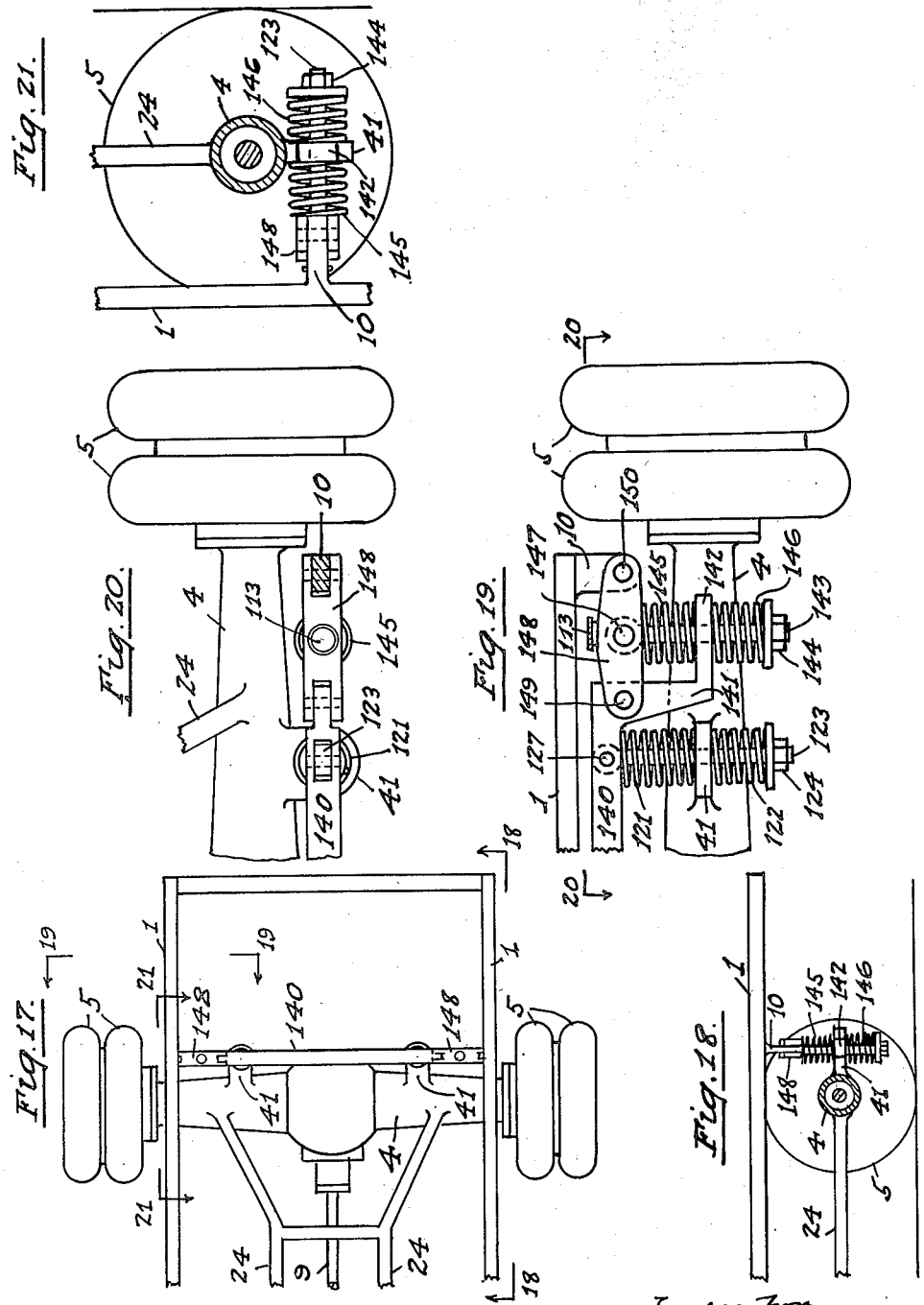

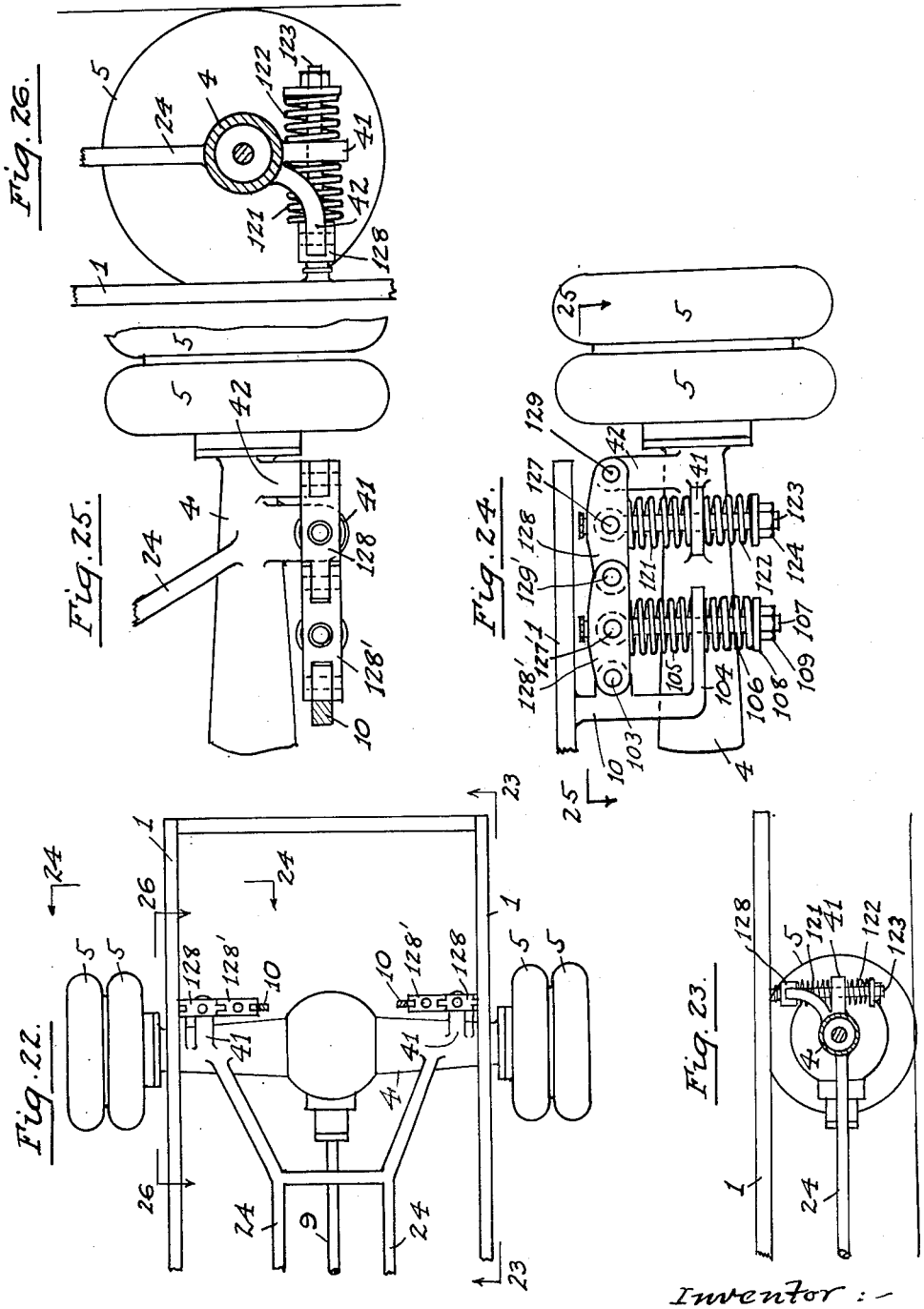

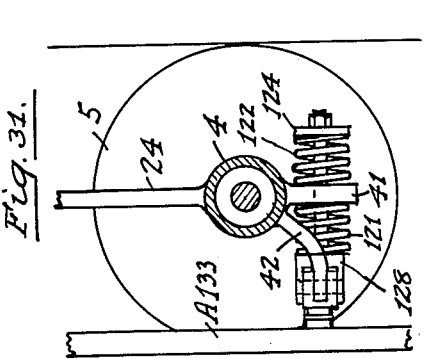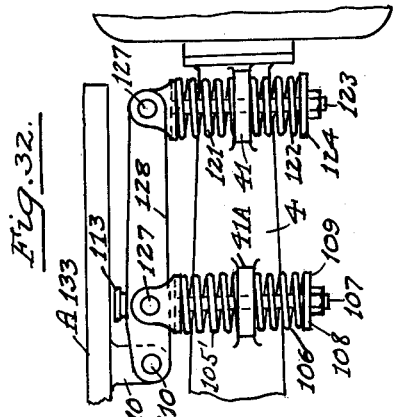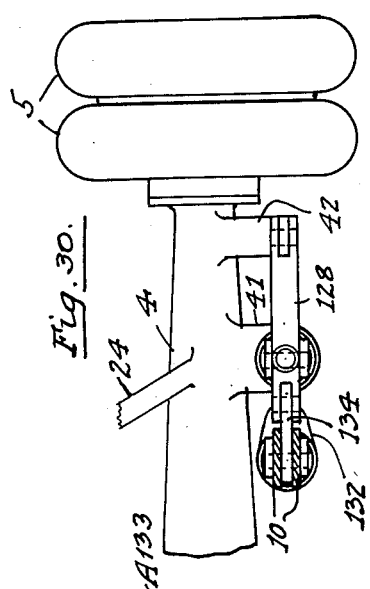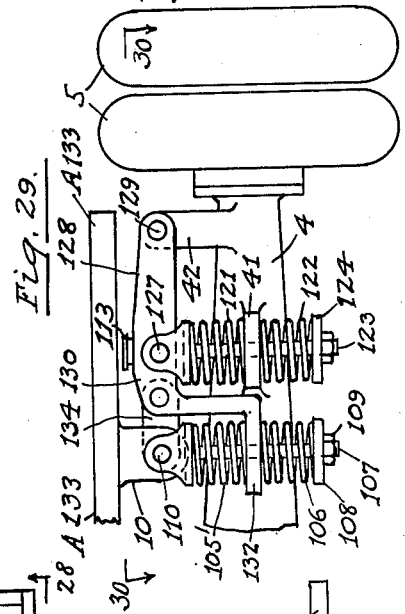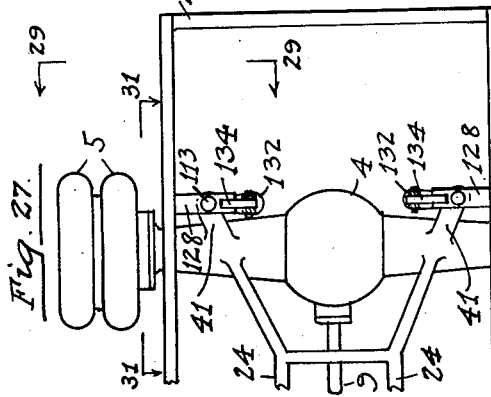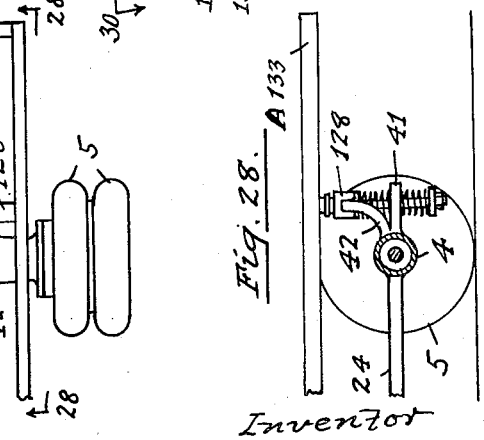

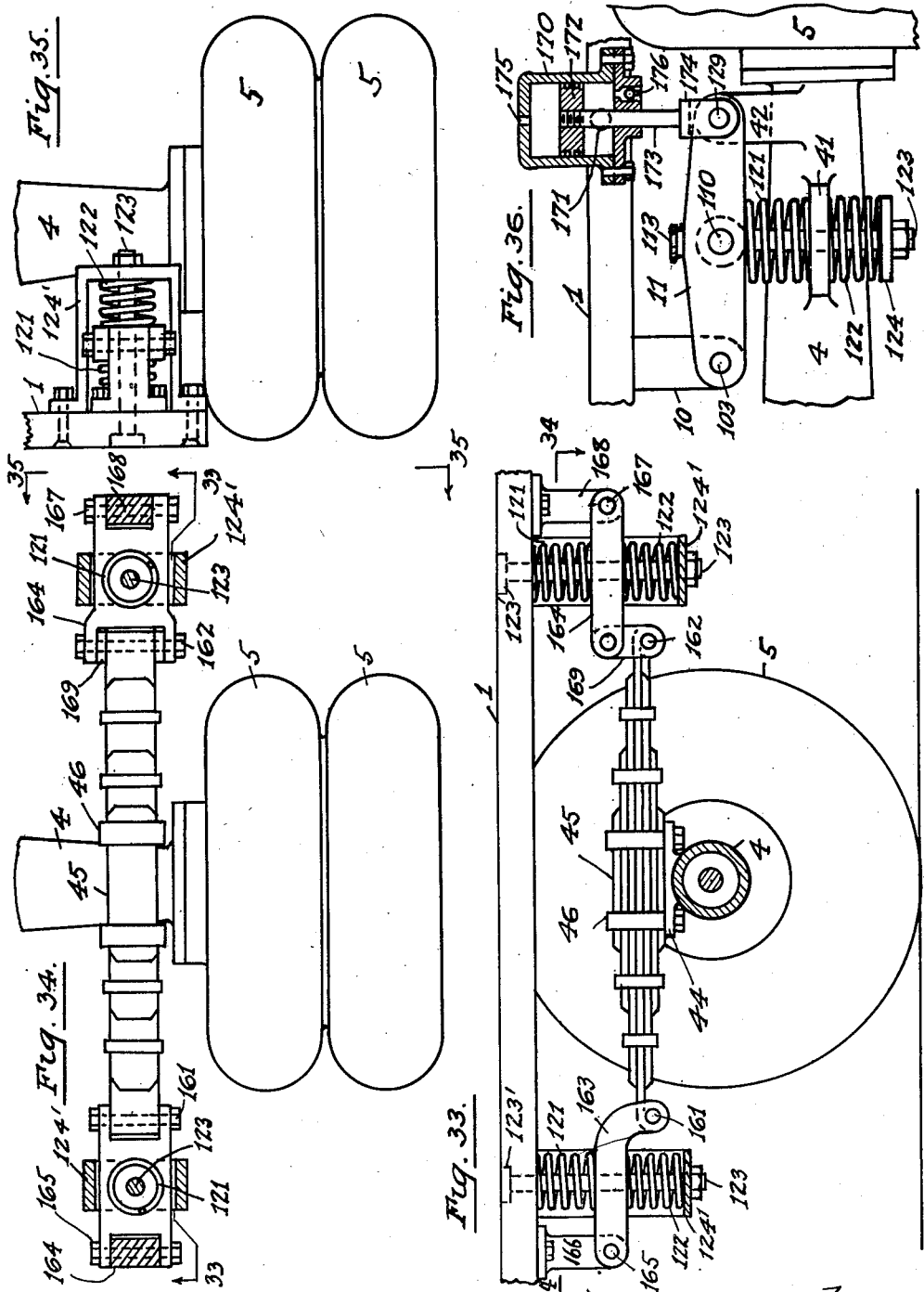

Patented Nov. 19, 1940

2,222,397

UNITED STATES PATENT OFFICE 2,222,397

STABILIZING SUSPENSION SYSTEM FOR MOTOR-DRIVEN VEHICLES

Amel B. Broluska, Detroit, Mich.

Application August 3, 1938, Serial No. 222,848

4 Claims. (Cl. 280—124)

My invention relates to flexible suspension means for motor-driven vehicles, and its principal object is to provide a flexible connecting means between the chassis frame and the axles, or between the body and the axles in cases where no chassis frame is employed, the said means being so constructed as to provide a greater freedom of the body from shocks and vibrations due to variations in the road surface and other causes, and also to lateral sway of the vehicle when driving around curves.

In motor vehicles as at present constructed the connections between the chassis frame and the front and rear axles consists essentially of a number of leaf springs operating in conjunction with shackle links which operate in a horizontal plane, so that the freedom of movement is very much reduced due to the friction of the shackle links.

According to the present invention the connection between the chassis frame and the axles, or between the body and the axles in cases where the body is re-enforced in such manner as to dispense with the usual chassis frame, consists essentially of a series of shackle links adapted to operate in a vertical plane in cooperation with springs or other resilient means.

Another object of my said invention is to provide a construction in which the shackles are provided with automatically lubricating means contained within the same so as to provide a substantially frictionless movement between the parts and to obviate the troubles due to neglected oiling which occurs with shackles of ordinary construction.

Another object is to provide a shackle suspension means arranged in cooperative relation with fluid pressure shock-absorbing means by which the safety and comfort of the passengers and freedom from wear and tear on the mechanism is very much enhanced.

A further object of my said invention is to provide a flexible suspension means which is simple in construction and economical to manufacture according to modern production methods.

With these and other objects in view, I will now describe a preferred embodiment of my invention with reference to the accompanying drawings, in which—

Figure 1 is a plan view showing a chassis adapted for use in connection with light buses and trucks and provided with my improved suspension system.

Figure 2 is a side elevation of the same taken on line 2—2 of Figure 1.

Figure 3 is a fragmentary end elevation, drawn to an enlarged scale, taken on line 3—3 of Figure 1 showing the constructional details of the suspension.

Figure 4 is a fragmentary plan view of the same.

Figure 5 is a fragmentary side elevation of the same, taken on line 5—5 of Figure 4.

Figure 6 is a vertical section taken on line 6—6 of Figure 4 and drawn to a still larger scale showing the details of my self-lubricating shackle member and associated parts.

Figure 7 is a plan view taken in section on line 7—7, Figure 6.

Figure 11 is a fragmentary rear elevation showing a modified form of my improved suspension system to be hereinafter described.

Figure 12 is a fragmentary plan view of the same, taken on line 12—12 of Figure 11.

Figure 13 is a fragmentary side elevation of the same, taken on line 13—13 of Figure 12.

Figure 14 is a fragmentary plan view corresponding to Figure 12 but illustrating the employment of a single shackle in place of the pair of shackles therein shown, such as would be employed in connection with lighter vehicles.

Figure 15 is a plan view illustrating a chassis frame provided with a suspension system of the type shown in Figures 11, 12 and 13, and Figure 16 is a side elevation of the same taken on line 16—16 of Figure 15.

Figure 17 is a fragmentary plan view showing the rear portion of a chassis frame provided with a modified form of my improved suspension.

Figure 18 is a side elevation of the same taken on line 18—18 of Figure 17.

Figure 19 is a fragmentary end elevation taken in section on line 19—19 of Figure 17 and drawn to an enlarged scale.

Figure 20 is a plan view of the same.

Figure 21 is a fragmentary side elevation of the same taken on line 21—21 of Figure 17, also drawn to enlarged scale.

Figure 22 is a fragmentary plan view showing the rear portion of a chassis frame equipped with a still further modified form of my improved suspension.

Figure 23 is a side elevation of the same taken on line 23—23 of Figure 22.

Figure 24 is a fragmentary end elevation taken on line 24—24 of Figure 22 but drawn to an enlarged scale.

Figure 25 is a plan view of the same, taken on line 25—25 of Figure 24.

Figure 26 is a fragmentary side elevation taken on line 26—26 of Figure 22, also drawn to an enlarged scale.

Figure 27 is a fragmentary plan view showing the rear end of a special body equipped with a still further modified form of my improved suspension.

Figure 28 is a side elevation of the same taken on line 28—28 of Figure 27.

Figure 29 is a fragmentary rear elevation showing details of the suspension drawn to an enlarged scale taken on line 29—29 of Figure 27.

Figure 30 is a plan view of the same, taken on line 30—30 of Figure 29.

Figure 31 is a side elevation of the same taken on line 31—31 of Figure 27.

Figure 32 is a fragmentary rear elevation corresponding to Figure 29 but showing a modified form of the suspension.

Figure 33 is a fragmentary side elevation taken in section on line 33—33 of Figure 34 showing the employment of my improved suspension in conjunction with a leaf spring of the conventional type, and Figure 34 is a plan view showing the same construction, taken on line 34—34 of Figure 33.

Figure 35 is a fragmentary end elevation taken on line 35—35 of Figure 34, and

Figure 36 is a fragmentary side elevation showing one method of applying fluid pressure shock absorbing means to the shackles of my improved suspension.

Like characters designate corresponding parts throughout the several views.

Figure 8:
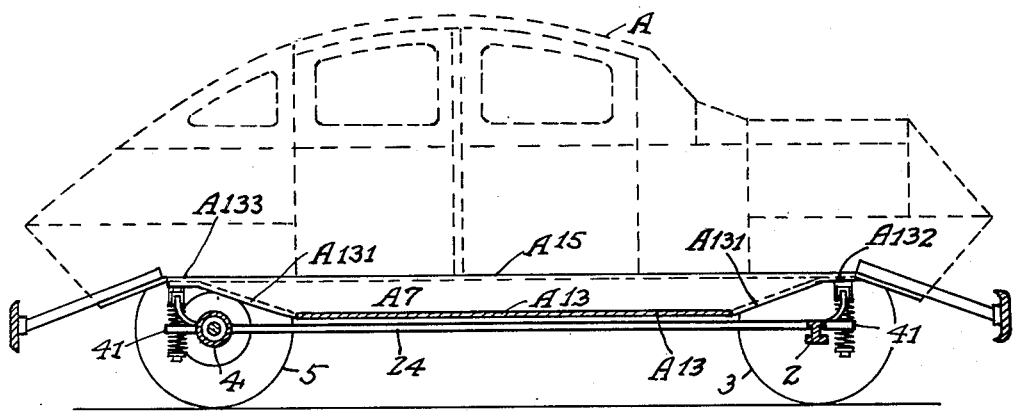
Figure 8 is a side elevation showing the application of my improved suspension to a super-streamlined safety body of the type described in my pending application Serial No. 164,279, filed September 17, 1937, taken in section on line 8—8 of Figure 9.

Referring more particularly to Figures 1 to 7 of the drawings, 1 designates a chassis frame adapted for use in connection with light trucks and buses having the usual front axle 2 equipped with single steering wheels 3 and the rear axle 4 equipped with duplex driving wheels 5. 6 designates the engine having the usual radiator 7, transmission 8, and drive shaft 9, all of which are of conventional construction and need not be further described herein. The suspension means, in this case drawn to enlarged scale in Figures 3, 4 and 5, consist essentially of a pair of lugs 10 formed integral with or secured to the chassis frame 1 and connected by shackles 11 to a central transverse member 12, the lugs 10 and the transverse member 12 being provided with openings 101, 121, respectively, adapted to receive the ends 102 of the shackles 11 which are secured in position by the pivot pins 103. The lugs 10 extend downwardly, as shown more clearly in Figure 3, and are provided with inwardly extending horizontal members 104, the opposed inner ends of which are connected by a substantially U-shaped member 105. Abutting upon the members 104 are upper and lower helical compression springs 105, 106, respectively, the said springs being held in position by bolts 107, the upper ends of which are connected to the centers of the shackles 11 by pins 110 while the lower ends are provided with washers 108 and nuts 109. In vertical alignment with the member 12 are the upper and lower helical compression springs 121, 122, respectively, the adjacent ends of which abut upon the brackets 41 secured to or integral with the rear axle 4, the said springs being retained in position by the central bolt 123, the upper end of which threadedly engages the member 12 while the lower end is provided with washers 124, between which is inserted a washer of rubber or other soft material 125 and upon the lower end of the bolt is a nut 126.

In this construction, when the road wheels 5 are deflected upwards by impact upon an obstacle or projection upon the road surface, the bracket 41 upon the axle is moved upwards towards the chassis frame 1 compressing the spring 121 to a certain extent and also forcing the member 12 upwards, which causes the shackles 11 to swing about their outer pins 103, thus putting the springs 106 into compression so that upward movement of the axle is cushioned very effectively by the horizontal swinging movement of the shackles and the multiple springs which receive the upwardly exerted forces. When, however, the road wheels descend after passing the obstacle, the brackets 41 moving downwardly exert a compressive force upon the springs 122, pulling downwards the member 12 and swinging the shackles 11 downwardly about their outer pivots 103, thus putting the springs 105' into compression and effectively cushioning the downward force. Thus, the vertical movements of the axles in relation to the chassis frame are effectively cushioned in both directions. In order to still further soften the impact forces, washers 125 of rubber or other soft material may be interposed between metal washers 124, as shown in Figure 3, and this construction may be applied at all points between the helical springs and their abutting surfaces.

In Figures 6 and 7 I have illustrated a method of automatically and effectively lubricating the shackles 11. In this construction a centrally disposed oil well 111 is connected by openings 112 with the openings which receive the pins 103 and 110 so that the bearing surfaces of the pins are constantly and thoroughly lubricated. A screw cap 113 forms a suitable closure for the oil well, as will be understood.

The front axle 2 is provided with the usual steering knuckles 21 having the steering arms 22 which are connected by the transverse steering rod 23 and operated by any usual form of steering wheel and gear through a drag link, not shown. In order to prevent rotary movement of the front and rear axles these latter are connected by longitudinal brace members 24 between which the drive shaft 9 is located.

Figure 9:
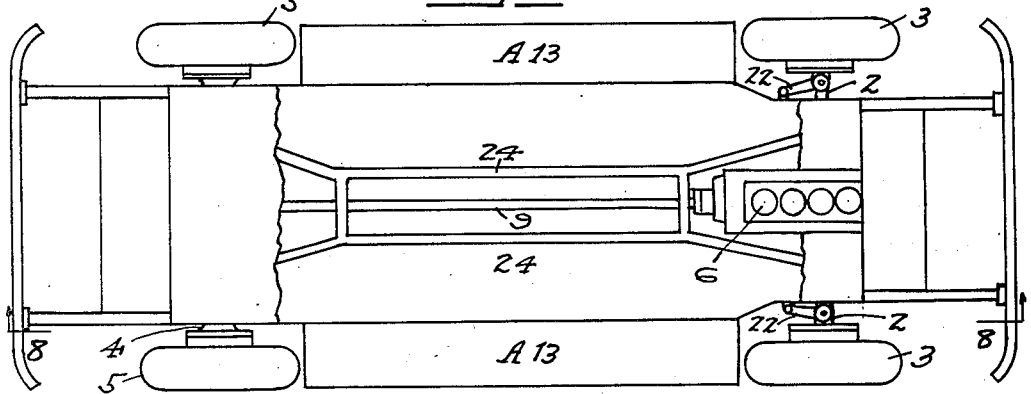
Figure 9 is a plan view showing the suspension system with the body removed.
Figure 10:
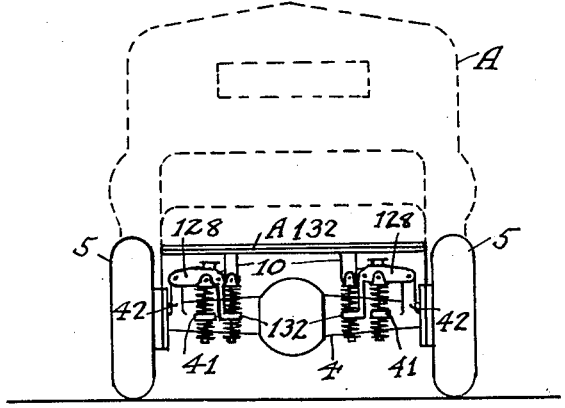
Figure 10 is a rear elevation of the same.

Figures 8, 9 and 10 of the drawings illustrate the application of my invention to a stream-lined body of the type described in my pending application, Serial No. 164,279 in which the usual chassis frame is dispensed with and the lower portion of the body is formed as a rigid structure. According to this construction the body A of stream-lined shape is provided with a transverse floor plate A15 and another plate A13 positioned below the same, the two plates being connected by longitudinal channel members A7 forming a box-like structure which possesses such rigidity that no chassis frame is necessary. Further, the lower plate A13 is extended laterally so as to form running boards on each side of the body.

The method of applying my improved suspension to the special form of body just described is shown in detail in Figures 27 to 31, inclusive, of the drawings. In this arrangement the lower member A13 of the body, as shown in Figures 8 and 9 of the drawings, is bent upwards forwardly and rearwardly as at A131 in Figure 8, and has its ends connected to the upper member A15 by welding or otherwise as at A132, A133, in Figure 8. The front and rear axles are connected by longitudinal brace members 24, hereinbefore referred to, between which is located the drive shaft 9, and the points A132, A133 in front and rear, respectively, are connected to the corresponding axles in the manner following. Thus the point A133 located substantially over the rear axle 4 is provided with a pair of lugs 10 which extend downwardly, while the axle 4 is provided with centrally disposed brackets 41 and with upwardly extending lugs 42. Above and below the brackets 41 are helical compression springs 121, 122, respectively, through which pass the bolts 123, the upper ends of which are connected by the pins 127 to shackles 128, the latter being pivoted at 129 to the lugs 42. The shackles 128 have inwardly extending short arms 130 which extend downwardly as at 131 and outwardly as at 132. Above and below the portions 132 of the shackles are the upper and lower helical compression springs 105', 106, respectively, through which extend bolts 107 having at their lower ends washers 108 and nuts 109 and being connected by pins 110 to the lugs 10. The adjacent ends of the shackles 128 and the lugs 10 are bifurcated in such manner as to receive the intermediate links 134.

In this construction, when the road wheels are deflected upwards by impact as before explained the brackets 41 upon the axle 4 are moved upwards toward the reinforced portion A133 of the body, compressing the springs 105' and 121 to a certain extent, while when the road wheels descend, the brackets 41 move downwards compressing the springs 122 and 106 to a certain extent, thus cushioning the downward movement of the axle, the two sets of springs forming a compound resilient mechanism which results in easy riding of the vehicle under all conditions of road surface.

In the modification shown in Figure 32, there are provided upon the axle 4 two pairs of centrally disposed brackets 41, 41A. Above and below the bracket 41 are the helical springs 121, 122, respectively, which are held in position by bolts 123 and washers 124, the bolts 123 being connected by pins 127 to a shackle 128, the latter being pivoted at 110 to the lugs 10 upon the member 133. In this arrangement, when the axle is pressed upwards by some obstacle upon the road surface, the springs 105' and 121 are compressed to a very different extent. When, however, the axle rebounds, moving downwardly, the springs 106 and 122 are similarly compressed to different degrees. By this arrangement the differential action between the respective sets of springs eliminates the excessive periodical vibrations which would otherwise occur with a single set of springs when the periodicity of the springs corresponds with the periodicity of the body as a whole.

In Figures 11 to 16, inclusive, of the drawings I have shown a simplified form of my improved suspension which will now be described. Figures 15 and 16 show a plan view and side elevation, respectively, of a chassis frame embodying this particular form of suspension, while Figures 11 to 13, inclusive, illustrate the suspension drawn to an enlarged scale. Upon the axle 4 are the centrally disposed brackets 41 above and below which are the coil springs 121 and 122, respectively, which are held in position by the bolts 123 and washers 124. The upper ends of the bolts 124 are connected by pins 110 to the shackles 11, the said shackles being pivoted as at 103 to downwardly extending lugs 10 upon the chassis frame 1. The outer ends of the shackles 11 are connected as by pins 129 to the upwardly extending lugs 42 upon the axle 4. The operation of this form of suspension will be readily understood by comparison with those previously described. It will be noted, however, that while in Figures 11 to 13, inclusive, shackles are disposed upon both sides of the rear axle, which would be necessary for heavy classes of work, in Figure 14 I have shown a plan view corresponding to Figure 12 of the drawings in which a shackle is shown in the rear only of the axle 4, this being deemed sufficient to support the loads in lighter vehicles.

In Figures 17 to 21, inclusive, I have illustrated a still further modified form of my suspension system, Figure 17 being a fragmentary plan view and Figure 18 a fragmentary side elevation taken in section on line 18—18 of Figure 17, while Figure 19 shows a fragmentary view of the suspension drawn to an enlarged scale taken on line 19—19 of Figure 17, Figure 20 is a plan view of the same, and Figure 21 is a fragmentary rear elevation taken on line 21—21 of Figure 17. In this modification there are provided upon the rear axle 4 the brackets 41, above and below which are the helical compression springs 121, 122 held in position by the bolts 123 and nuts 124, the bolts being connected at their upper ends by pins 127 to a cross member 140 arranged below and in parallel relation to the chassis frame 1. The member 140 is provided with downwardly extending end portions 141 which terminate in horizontal lugs 142. Above and below these lugs are the helical compression springs 145, 146, respectively, held in position by bolts 143 having nuts 144. The upper ends of the bolts 143 are connected by pins 147 to the shackles 148, the inner ends of which are connected by pins 149 to the downwardly extending portions 141 of the member 140, while the outer ends are connected by pins 150 to the downwardly extending lugs 10 upon the chassis frame. In this arrangement, when the rear axle 4 moves upwardly carrying with it the brackets 41, the member 140 is forced yieldingly upwards through compression of the spring 121, causing the inner end of the shackle 148 to move upwards also, putting the spring 146 into compression as the shackle swings around the pin 150. When, however, the axle 4 rebounds in a downward direction, the brackets 41 tend to compress the springs 122 and to yieldingly pull down the cross member 140 which causes the shackle 148 to swing downwards around its pin 150, compressing the spring 145. By this compound arrangement of two sets of springs having differential movements, it is believed that the small vibrations found in ordinary suspensions will be automatically damped or cancelled out.

In Figures 22 to 26, inclusive, I have shown a still further modification in which compound differential springs are employed in a manner somewhat similar to that just described with reference to Figures 17 to 21, inclusive.

In this modification there are the brackets 41 upon the rear axle 4 and above and below these brackets are the helical compression springs 121, 122, respectively, secured in position by the bolts 123 and nuts 124, and the upper ends of the said bolts are connected by pins 127 to the centers of shackles 128, the outer ends of which are connected by the pins 129 to upwardly extending lugs 42 upon the rear axle. The inner ends of the shackles 128 are connected by pins 129' to the outer ends of shackles 128', the inner ends of the latter shackles being connected by pins 103 to downwardly extending lugs 10 upon the chassis frame 1. The lugs 10 terminate in horizontal portions 104 above and below which are the helical compression springs 105, 106, respectively, which are secured in position by the bolts 107, washers 108 and nuts 109, the said bolts being connected at 127' to shackles 128'.

It will be observed in this modification, that when the rear axle 4 together with the brackets 41 is moved upwardly, the springs 121 are compressed so as to yieldingly cause the shackle 128 to swing upwardly about the pin 129, moving with it the outer end of the shackle 128', causing the springs 106 also to be compressed. When, however, the axle in rebounding moves downwards, the springs 122 and 105 are compressed, the action being very similar to that just described with reference to Figures 17 to 21, inclusive.

In Figures 33, 34 and 35 I have shown a modification of my improved suspension in which the horizontally disposed shackles, which are common to the modifications already described, are combined with a laminated spring similar to those at present commonly employed in motor vehicles. In this arrangement, the rear axle 4, carrying the driving wheels 5, is provided with spring seats 44 of the well known type upon which are mounted laminated springs 45 held in place by the U-shaped straps 46. The spring 45 is provided at its front and rear ends with pins 161, 162, respectively, which serve to connect it to the front and rear shackles 163, 164. The front shackles 163 are connected by pins 165 to brackets 166 secured to the underside of the chassis frame 1, while the shackles 164 are connected by pins 167 to brackets 168 also secured to the chassis frame. The shackles 164 are connected by dependent links 169 to the pins 162 and in order to maintain the spring in normally horizontal position the adjacent ends of the shackles 163 are bent downwardly as will be seen from the drawing. Above and below each of the shackles are the helical coil springs 121, 122, respectively, held in position by central bolts 123 and brackets 124', the upper ends of the bolts being secured to the chassis frame as by bolt heads 123' which are disposed in recesses in the frame.

From this description it will be seen that the resilient cushioning effect of the main laminated spring 45 is augmented by the action of the coil springs, and great freedom of movement is obtained by the use of horizontally disposed shackles in front and rear.

In Figure 36 of the drawings I have illustrated one way of adding fluid pressure shock-absorbing means to my improved suspension of a design corresponding to that shown in Figure 11 of the drawings. Shackles in this case, together with their connections to the chassis frame and to the rear axle, will be readily understood by comparing the two figures, the same characters being used to designate similar parts. In order to provide shock-absorbing means so as to cushion the impact of the suspension, I provide a cylinder 170 oscillatably connected as by trunnions 171 (shown in broken lines) to the chassis frame 1, and in this cylinder I provide a piston 172 having a rod 173, the lower end of which is formed as a yoke 174 adapted to embrace the shackle 11 to which it is connected by the pin 129, which serves also to connect it to the upwardly extending bracket 42 upon the rear axle. An opening 175 is provided in the upper end of the cylinder so that the upward movement of the piston is not greatly retarded, while the lower end of the cylinder is provided with a spherical valve 176 so designed as to allow the piston to move upwards freely, but to retard downward movement of the piston on the rebound. The fluid in the cylinder may be air or oil, as desired. The operation of the fluid pressure shock-absorbing means is so generally known that no further description is deemed necessary.

It will be observed from the foregoing description and by reference to the drawings that I have provided an improved suspension which is very flexible in construction and calculated to reduce as far as possible the vibration of the body of the automobile, even under the most violent impact forces resulting from irregularities of the road surface and other causes. This is due to the fact that in all cases of my improved suspension, the shackles move in a vertical plane and are controlled by helical springs in such manner that the movement of the chassis is very small in proportion to the movement of the axles and wheels.

It will be noted that the various details herein shown can be combined in various ways other than herein set forth. It is obvious that the identical elements may be combined with the usual front axle as well as with the rear axle in conjunction with which it is for the most part shown in the drawings; also, that any of the modified shackle systems herein shown may be employed singly or in pairs to either of the axles, this being determined by the loads to be carried and the nature of the service.

It will be seen that the brace members 24, being rigidly connected to the front and rear axles with which also the brackets 41 are integral or otherwise rigidly attached, constitute a complete rigid frame as described in the claims adapted to receive the downward pressure of the various shackle constructions. The oiling system as shown in Figure 7 can obviously be applied to any of the various shackles, and with the shackles may be used either common pins secured in place by cotters or other means, or may be formed as bolts with nuts at either end. Furthermore, the upper ends of bolts such as designated 107 may be constructed as shown in Figure 6 of the drawings or in other ways to maintain the concentricity of the springs, and the retaining washers may be similarly arranged.

Having thus described my said invention, what I claim and desire to secure by Letters Patent of the United States is:

1. In an automobile, the combination, with front and rear axles having road wheels, of a frame connecting said axles and having projections extending forwardly and rearwardly therebeyond, a body positioned above said axles, and resilient shackle means interposed between said body and said frame, said means comprising transverse shackle links having their inner ends pivoted to said body and their outer ends pivoted to said axles and having downwardly extending eyebolts pivoted intermediate their ends, openings in said frame slidably receiving said eyebolts, and helical springs surrounding said eyebolts positioned above and below said frame and adapted to resist upward and downward movements of said bolts and said shackle links relative to said axles.

2. In an automobile, the combination, with front and rear axles having road wheels, of a frame connecting said axles and having projections extending forwardly and rearwardly therebeyond, a chassis positioned above said axles, and resilient shackle means interposed between said chassis and said frame, said means comprising transverse shackle links having their inner ends pivoted to said chassis and their outer ends pivoted to said axles and having downwardly extending eyebolts pivoted intermediate their ends, openings in said frame slidably receiving said eyebolts, and helical springs surrounding said eyebolts positioned above and below said frame and adapted to resist upward and downward movements of said bolts and said shackle links relative to said axles.

3. In an automobile, the combination, with front and rear axles having road wheels, of a frame connecting said axles and having projections extending forwardly of said front axle and rearwardly of said rear axle, a body positioned above said axles, and resilient shackle means interposed between said body and said frame, said means comprising transverse shackle links having their inner ends pivoted to said body and their outer ends pivoted to said axles and having downwardly extending eyebolts pivoted intermediate their ends, openings in said projections slidably receiving said eyebolts, and helical springs surrounding said eyebolts positioned above and below said frame and adapted to resist upward and downward movements of said bolts and said shackle links relative to said axles.

4. In an automobile, the combination, with front and rear axles having road wheels, of a frame connecting said axles and having projections extending forwardly of said front axle and rearwardly of said rear axle, a chassis positioned above said axles, and resilient shackle means interposed between said chassis and said frame, said means comprising transverse shackle links having their inner ends pivoted to said chassis and their outer ends pivoted to said axles and having downwardly extending eyebolts pivoted intermediate their ends, openings in said projections slidably receiving said eyebolts, and helical springs surrounding said eyebolts positioned above and below said frame and adapted to resist upward and downward movements of said bolts and said shackle links relative to said axles.

AMEL B. BROLUSKA.